(12) United States Patent
Mattes et al.

(10) Patent No.: US 6,851,713 B2
(45) Date of Patent: Feb. 8, 2005

(54) DEVICE FOR BELT FORCE AND BELT USE RECOGNITION

(75) Inventors: Bernhard Mattes, Sachsenheim (DE); Erich Zabler, Stutensee (DE); Anton Dukart, Gerlingen (DE); Ulrike Groeger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/243,256

(22) Filed: Sep. 13, 2002

(65) Prior Publication Data

US 2003/0116953 A1 Jun. 26, 2003

(30) Foreign Application Priority Data

Sep. 21, 2001 (DE) .......................... 101 46 630

(51) Int. Cl.[7] .............................................. B60R 22/00
(52) U.S. Cl. .................................................. 280/801.1
(58) Field of Search ..................... 280/801.1; 180/268, 180/270; 24/303, 633

(56) References Cited

U.S. PATENT DOCUMENTS

| | | | | |
|---|---|---|---|---|
| 4,702,492 A | | 10/1987 | Andres et al. | |
| 5,742,986 A | * | 4/1998 | Corrion et al. | 24/633 |
| 5,898,366 A | * | 4/1999 | Brown et al. | 340/457.1 |
| 5,960,523 A | * | 10/1999 | Husby et al. | 24/633 |
| 5,966,784 A | * | 10/1999 | Arbogast et al. | 24/633 |
| 5,970,587 A | * | 10/1999 | Knox | 24/633 |
| 6,079,744 A | | 6/2000 | Husby et al. | |
| 6,259,042 B1 | | 7/2001 | David | |
| 6,389,661 B1 | * | 5/2002 | Brown et al. | 24/633 |

* cited by examiner

*Primary Examiner*—Faye M. Fleming
(74) *Attorney, Agent, or Firm*—Michael J. Striker

(57) ABSTRACT

A belt lock (8) for receiving an attachment element (2) of a safety belt (1) has an insertion opening (10) for the attachment element (2). In the belt lock (8), a connection element (20) is provided, which penetrates a locking opening (3) on the attachment element (2). The connection element (20) is disposed on a flat spring-type carrier (17), via which an insertion movement (24) of the connection element (20) into the locking opening (3) of the attachment element (2) takes place, when the attachment element operates a locking lever (12) by its insertion movement. The insertion movement (24) of the connection element (20) is monitored via a magnetic circuit containing a magnetic field-sensing sensor (31). A component (11, 20) of the belt lock (8) that fixes the attachment element (2) of the safety belt (1) is associated with a measuring element (20), with which a force operating on the belt lock can be determined via the magnetic circuit (16, 31).

7 Claims, 3 Drawing Sheets

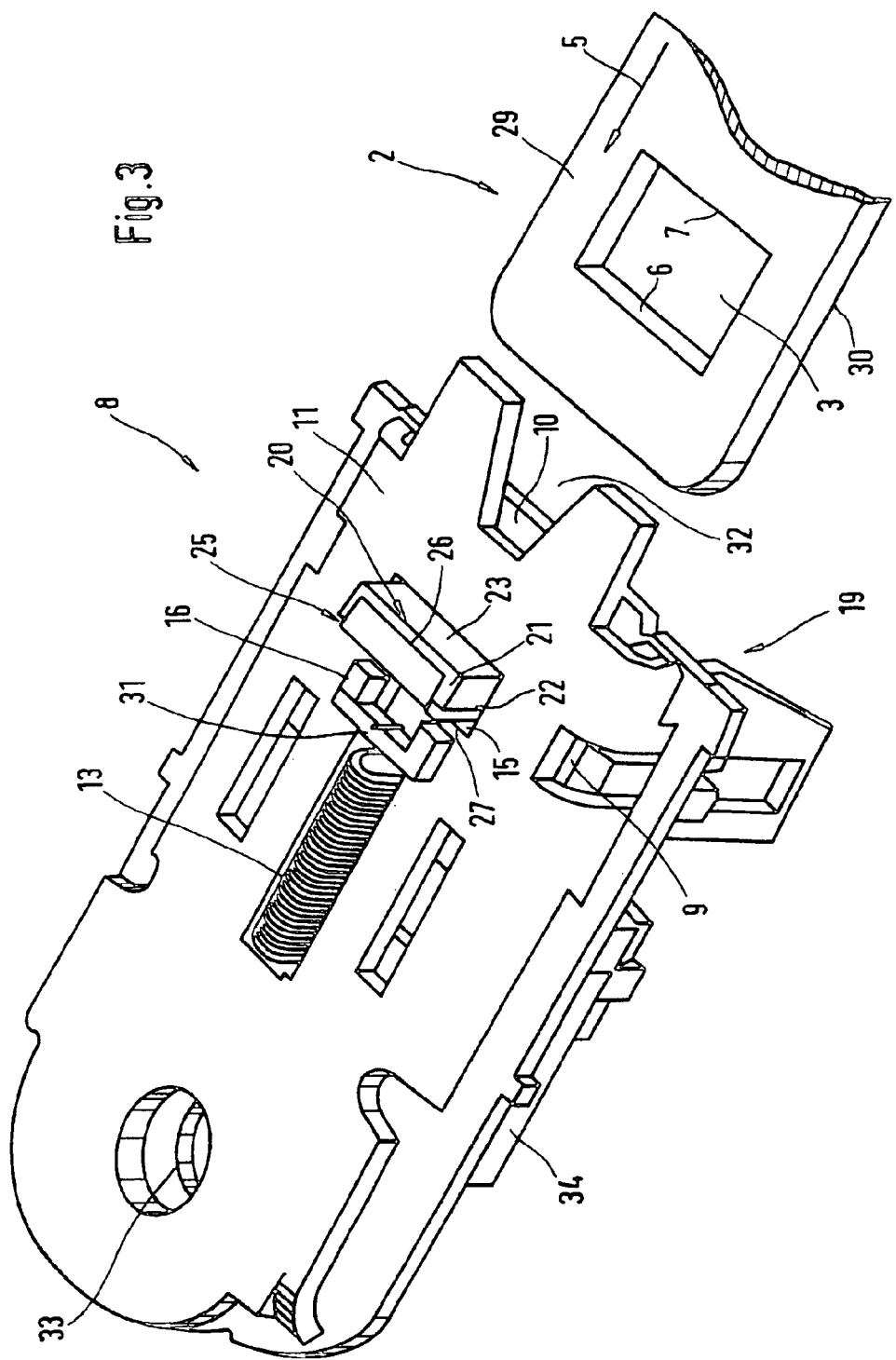

DEVICE FOR BELT FORCE AND BELT USE RECOGNITION

BACKGROUND OF THE INVENTION

Passenger protection systems, such as, for example, safety belts, today are standard equipment in motor vehicles. The snap connections of the safety belts lock in a belt lock and protect the passengers of an automobile or of another type of vehicle in the event of an accident. The belt locks are generally associated with detection elements, which detect the state and position of the safety clasp of the safety belt in the belt lock. By means of the detection elements, it is determined whether the belt is locked or unlocked, and the passengers are aurally notified and/or the driver is aurally and/or optically notified.

From U.S. Pat. No. 6,079,744, a belt lock with a detection unit for the safety claps of the safety belt is known. The safety clasp is incorporated on a flexible safety belt. By means of the safety claps, the flexible safety belt is engaged and locked in the belt lock. Within the belt lock, a pin made of ferromagnetic material is disposed, which can be moved between inoperative and operative positions, in which the safety clasp of the safety belt is arrested within the belt lock. On the belt block, a magnetic field sensor is incorporated. By means of a magnet, a magnetic field is produced, whereby the magnet is included at a distance to the magnetic field sensor on the belt lock. The magnet and the magnet field sensor form a space, within which the magnetic field detected from the magnetic sensor changes the pin in a non-operational position, an operational position with the safety clasp, and an operational position without the safety clasp.

SUMMARY OF THE INVENTION

By means of the inventive solution, both the state of the safety claps in the belt lock and the operating force acting on the safety belt can be measured. The determination of the state of the safety clasp, that is, whether the clasp is locked or unlocked, as well as the pulling force on the belt lock, can be measured by means of a sensor with relatively little expense. In this connection, for example, a measuring element is mounted on a connecting element, which penetrates an opening of a fastening element (safety clasp) of the safety belt and attaches this thereby in the belt lock and also on other components of the safety lock on which the pulling force acts. The measuring element, for example, can be made from a ferromagnetic material.

The insertion opening of the belt lock includes a magnetic circuit above or below the insertion path of the attachment element of the safety belt, which includes a magnetic field sensitive sensor. The magnetic circuit is closed upon introduction of the attachment element of the safety belt through an acceleration of the connection, so that the magnetic field sensitive sensor produces the information that the "attachment element of the safety belt is correctly engaged in the belt lock". By means of a measuring element associated with the connection element, a displacement of the connection based on a change of the pulling force in the safety belt can be detected. Through a field intensity modulation of the magnetic field sensitive sensor, the pulling force on the safety belt in a proportional way of the connection element can be easily determined. The measuring element, with which a proportional force signal of the pulling force of the safety belt can be detected, moreover, can also be associated with an additional component of the belt lock, for example, the upper cover clasp of the belt lock, through which the connection element of the belt lock projects, upon correct engagement of the attachment element of the safety belt, and which is associated with the magnetic circuit, which includes the magnetic field sensitive sensor.

The detection of a force acting on the connection element of the belt lock can be performed for release of a belt tightening, as soon as a determined value for the pulling force on the safety belt is exceeded. The determined pulling force, furthermore, can be provided dependent on the magnitude of the determined force of the central release device for the passenger protection system (air bags). There, the information about the pulling force on the safety belts can be stored, in the event of an accident, and can be used to reconstruct the accident and to serve for further development of passenger protections systems with regard to the actual conditions that occur during an accident.

BRIEF DESCRIPTION OF THE DRAWINGS

FIG. 3 is a perspective plan view of the components of a magnetic circuit together with a measuring element on the connecting element.

DETAILED DESCRIPTION OF THE PREFERRED EMBODIMENTS

Figure 1:
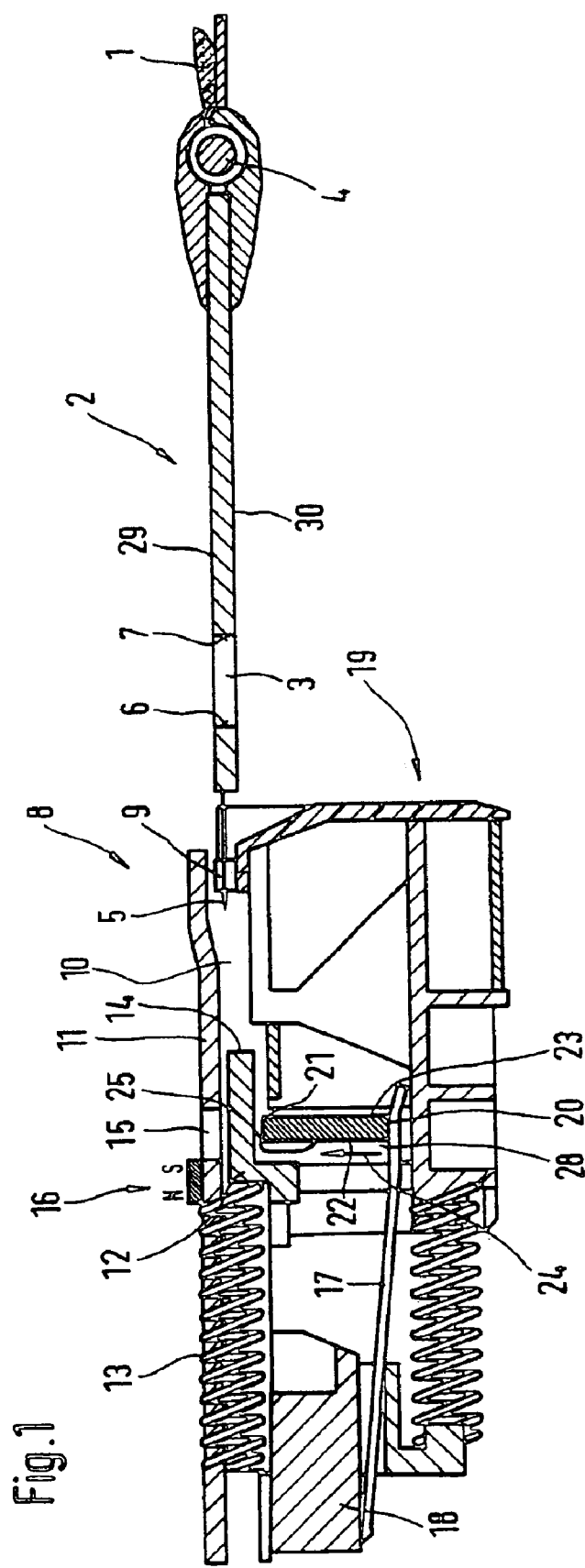
FIG. 1 shows an attachment element of a safety belt before insertion into a belt lock opening.

FIG. 1 is a representation of a belt clasp of a safety belt before the introduction in the insertion opening of a belt lock.

A safety belt 1, which represents the integral component of a passenger safety system for increasing the passive safety of vehicle occupants, is attachable by means of an attachment element 2, here shown in the form of a belt clasp, into a belt lock 8. The belt clasp, operating as an attachment element 2, is connected on a connection point 5 with the safety belt, whereby the pulling force occurring in the safety belt 1 is lead via the connection point 4 into the belt clasp operating as the attachment element 2.

The attachment element 2 includes a locking opening 3, which has a first side 6 and a locking side 7 opposite to this first side, respectively, related to the insertion direction 5 of the attachment element 2 into an insertion opening 10 of the belt lock 8. The upper side of the attachment element 2 is designated with reference numeral 29, while the underside of the attachment element 3 is identified with reference numeral 30. In the direction of the arrow 5, the belt clasp serving as the attachment element 2 of the safety belt 1 is introduced into the insertion opening 10 of the belt lock 8.

Guide sections 9 are provided in the insertion opening of the belt lock 8 for facilitating insertion movement of the attachment element 2 in the insertion direction 5. The guide sections 9 engage the side surfaces of the attachment element 2 and make possible a slant-free insertional movement of the attachment element into the insertion opening 10.

The insertion opening 10 is limited on one side by the underside of a cover clasp of the belt lock 8 and on the other side, by the body 19 of the belt lock 8. On ends of the slot-shaped insertion opening 10, a locking lever 12 is provided, which is biased by means of a spring element. The side associated with the front side of the attachment element 2, that is the support surface of the locking lever 12, is designated with reference numeral 14. Above the locking lever 12, in its position shown in FIG. 1, an opening 15 is formed in the cover clasp 11 of the belt lock 8. The opening 15 on the upper side of the cover clasp 11 is associated with a magnetic circuit 16, with which an insertion movement 24 of a connection 20, which, for example, can be a snap pin, is monitored.

The connection 20, shown in FIG. 1 beneath the locking lever 12 in its deactivated position, preferably is made from a ferromagnetic material and is provided on a flat spring-shaped lever 17, which is retained in a receiving element 18. By means of the flat spring lever 17, the connection element imposes an engagement force in the direction of the opening 15 in the cover clasp 11 of the belt lock 8. The front side of the connection element 20 made from a ferromagnetic material is designated by reference numeral 21, and a first side of the connection element 20 is identified with reference numeral 22, while the side of the ferromagnetic connection element associated with the attachment element 2 is designated with reference numeral 23. The cover clasp 11, the receiving element 18 for the flat spring-shaped lever 17 of the connection 20, the spring element 13, which impacts the locking lever 12, as well as the locking lever itself 12, are arranged in the body 19 of the belt lock 8.

Figure 2:
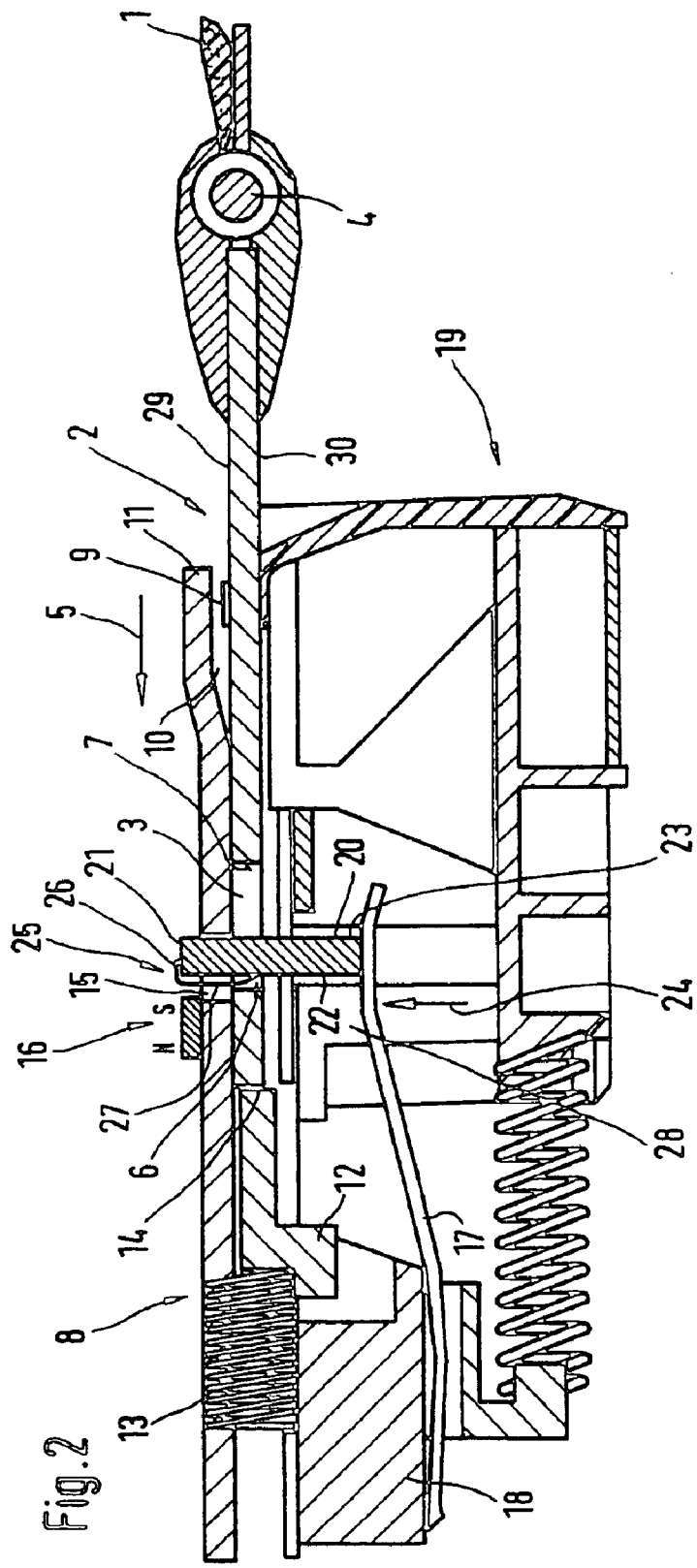
FIG. 2 shows an attachment element introduced into a belt lock in an engaged state.

FIG. 2 shows an attachment element inserted into a belt lock of a safety belt in a locked, or engaged, state.

From FIG. 2, it can be seen that the attachment element 2 of the safety belt 1 in the form of a belt clasp is inserted into the insertion opening 11 in the upper region of the belt lock 8. Through the insertion movement in the insertion direction 5 of the attachment element 2, the front side of the attachment element 2 associated with the locking lever 12 rests on the support surface 14 of the locking levers and presses it against the force of the spring element 13 in the body 19 of the belt clasp in the insertion opening 10, driving the locking opening 3 in the attachment element 2 over the front side 21 of the ferromagnetic connection 20. Subject to the spring biasing of the connection element 20 by means of the flatly configured carrier 17, the connection element 20 impels through the locking opening 3 into the opening 15 in the cover clasp 11 and rests on the upper side of the cover clasp 11 of the belt lock 8 with its upper region opposite the components of the magnetic circuit 16. By means of the components of the magnetic circuit 16, the insertion movement 24 of the connection 20 is entirely monitored. The representation of FIG. 2 provides that in this embodiment, a measuring element 25 is associated with the connection 20, and a front side region 26 of the measuring element 25 covers the front side 21 of the connection 20. A transverse section 27 of the deformable, elastic measuring element 25 runs parallel to the first side 22 of the connection 20 made from ferromagnetic material. The transverse section 27 of the measuring element 25 rests, as shown in FIG. 2, straight on the first side 6 of the locking opening of the attachment element 2 of the safety belt 1, while the second side 23 of the connection rests on the side opposite the measuring element 25 of the cover clasp 11 of the belt lock 8.

The hollow chamber 28 formed in the body 19 of the belt lock 8 makes possible a movement of the ferromagnetic connection 20 in the insertion direction 24. By means of the elastic biasing through the locking lever 12 over the front side 21 of the connection 20, the connection 20 impels upwardly, upon freeing of the front side 21 through reversing the lever 12, whereby the connection penetrates the locking opening 3 of the attachment element 2, as well as the opening in the cover clasp 11 of the belt lock 8. The hollow chamber 28 makes possible the movement of the flat spring-type spring element 17, which is fixedly placed in a receiving area 18 in the body 19 of the belt lock 8.

Through introduction of the upper region of the ferromagnetic connection element 20, the magnetic circuit 16 is closed, the magnetic circuit 16 including a magnetic field-sensing sensor element 31, preferably in the form of an analogue, fully integrated Hall sensor. Therefore, a first information, "the belt is correctly inserted", is initiated, which is either optically or aurally provided on the area of the instrument panel or directly on the vehicle seat. By means of an elastic, deformable measuring element 25 on the belt lock 8, moreover, a change of the force on the safety belt 1 can be determined. The change of the force in the safety belt 1 is transmitted to the attachment element 2, formed as a belt clasp with a locking opening 3. This, in turn, transmits a change of the pulling force in the safety belt 1 onto the ferromagnetic carrier element 20 secured on the flat spring-shaped carrier 17. A deviation of the connection proportionally to the change of the force in the safety belt 1 leads to a displacement of the spring-type measuring element 25 from its original position. The force-proportional change of the position of the spring-configured measuring element 25 can be detected through field intensity modulation in the magnetic field-sensing sensor 31 of the magnetic circuit 16. Correspondingly, the positional change of the connection element 20 and the measuring element 25 provided thereon generates a force-proportional signal, which serves as a control apparatus for releasing belt tightening or other occupant protection systems, such as air bags. Upon exceeding a predetermined path value of the connection element 20 of the belt lock 8, belt tightening can be released or in extreme cases, airbags, either front air bags or side air bags, can be released. The maximal force occurring in the belt lock in the event of an accident, moreover, can be stored in a central control system for releasing occupant protection systems of a vehicle and later be used to reconstruct the conditions of the accident. In addition, the maximal pulling forces in the safety belt occurring in the event of an accident can be determined and can be used for the further development of systems for improving passive protection of the occupants. Further, the determination of the belt force can be used for identification of the vehicle occupants. Individual belt force values, which are associated with determined vehicle occupants and whose values are saved, can be stored in the central electronics of a vehicle and can be used for occupant identification or for input safety characteristics.

In an embodiment not represented, the measuring element 25 also can be mounted on another component of the belt lock. This embodiment differs in that the spring-configured measuring element is provided on a component of the belt lock 8, which fixes the safety belt, that is, its fastening element 2 in the form of a belt clasp. Instead of the attachment of the measuring element 25 directly on the connection element 25, as shown in FIG. 2, the spring-type measuring element 25 also be can provided in the region of the opening 15 in the cover clasp 11 covering the belt lock 8. Similar to the arrangement shown in FIG. 2 of the components of the magnetic circuit 16 on the first side 22 of the connection, the components of the magnetic circuit 16 in a non-illustrated embodiment also can be associated to the second side 23 of the connection 20, which is associated to the attachment element 2 of the safety belt 1.

FIG. 3 shows a perspective plan view of the components of a magnetic circuit jointly with an attachment element on a connection element of a belt lock formed as a snap pin.

The attachment element 2 in the form of a belt clasp, which includes a locking opening 3, is inserted in the insertion direction 5 into the insertion opening 10 of the belt lock 8. The insertion movement of the attachment element 2 is facilitated through two oppositely disposed guides, to which the front sides of the attachment elements are guided parallel. In the belt clasp of the safety belt, which serves as the attachment device 2, the locking opening 2 is recognizable, which includes a first side 6 and a second side 7.

In the perspective illustration of FIG. 3, it is to be noted that the connection element 20 of the belt lock 8, formed as a snap pin, penetrates an opening 15 in the cover clasp 11 of the belt lock 8. In this embodiment, the spring-type configured measuring element 25 is provided on the connection element 20 and covers the front side 21 of the connection element 20 with a front section 26. A side section 27 of the spring-type measuring element 25 runs parallel to the first side 22 of the connection element 20. The magnetic circuit 16 is disposed opposite to the side section 27 of the spring-type measuring element 25. The magnetic field-sensing sensor 31, preferably in the form of a Hall sensor, is disposed in the magnetic circuit 16. Via a field intensity modulation in the magnetic field-sensing sensor 31, the path of the spring-type measuring element 25 (here provided on the connection element 20), proportional to the pulling force in the safety belt 1, can be determined. The perspective illustration of a belt lock 8 according to FIG. 3 further provides that the belt lock is secured on an abutment 33 in the vehicle. The underside of the body 19 of the belt lock 8 is designated with reference numeral 34. The cover clasp 11 in the upper region of the belt lock 8 extends in a V-shaped inclination 32 and facilitates the insertion movement of the attachment element 2 of the safety belt 1 into the insertion opening 10 of the belt lock 8 beneath the cover clasp 11.

With the inventive solution proposed by the present invention, only one sensor is needed to detect the engagement state, (i.e., the position) of the attachment element 2 in the belt lock 8, as well as the force occurring in the safety belt 1, that is, the changes in the force. The proposed solution represents a cost-effective measuring principle, which can be adapted easily to almost all belt locks 8 that are in use. The present invention operates as a compactly structured device, functioning with a static measuring principle, which can be universally adapted through the spring rigidity to various measuring regions. The distant-proportional and also force-proportional magnetic field is engaged contract-free in an air column in the magnetic circuit 16 with a field-sensing sensor 31. A good zero-point stability based on the inventive solution can be achieved. A high belt force leads to a small magnetic flow, an extended connection 20 to a smaller magnetic flow (B-field, magnetic flow separation), on account of which the specifications to the solution possibilities are small. The magnetic field-sensing sensor 31 with the associated valuation electronics (not shown) can be fully integrated, whereby a simple supply and very compact construction is made possible, so that supplementation upon vehicles in operation is made possible easily without great assembly expenditures.

It will be understood that each of the elements described above, or two or more together, may also find a useful application in other types of constructions differing from the types described above.

While the invention has been illustrated and described herein as a device for belt-force and belt-use recognition, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A belt lock for receiving an attachment element (2) of a safely belt (1) with an insertion opening (10) for the attachment element (2) and a connection element (20), said connection element (20) engaged in a locking opening provided in said attachment element (2) when in a locked state, wherein said connection element (20) is provided on a flat spring-type carrier (17), wherein an insertion movement (24) of the connection element (20) into the locking opening (3) takes place by means of said flat spring-type carrier (17), wherein, by means of the insertion movement of the attachment element (2), a locking lever (12) is operated, whereby the insertion movement (24) of the connection element (20) into the locking opening (3) is monitored by means of magnetic circuit (16) having a magnetic field-sensing sensor, wherein a measuring element (25) is disposed on a component (11, 20) of the belt lock (8) that secures said attachment element, and wherein said measuring element (25) detects a force acting on the belt lock (18) by means of said magnetic circuit (16, 31), wherein the measuring element (25) is secured on the connection element (20), wherein the measuring element (25) projects through an opening (15) of a cover clasp (11) when said attachment element (1) is in an inserted state in the locking opening (3), wherein said magnet circuit (16) is provided on said cover clasp (11), and wherein the measuring element (25) is deformable in an opening (15) of a cover clasp (11) of the belt lock (8).

2. The belt lock as defined in claim 1, wherein the connection element (20) penetrating the locking opening (3) of the attachment element (20) is made of a ferromagnetic material.

3. The belt lock as defined in claim 1, wherein the measuring element (25) has a front section (26) that engages over the front side (21) of the connection element (20) and section (27) running parallel to a first side (22) of the connection element (20).

4. The belt lock as defined in claim 1, wherein the measuring element (20) provided on the connection is deformable.

5. The belt lock as defined claim 1, wherein the measuring element (25) is made of a ferromagnetic material, such that with a change in force in the safety belt (2), said measuring element (25) is displaced from its original position.

6. The belt lock as defined in claim 1, wherein the magnetic field-sensing sensor (31) associated with the magnetic circuit (16) is a Hall sensor.

7. The belt lock as defined in claim 1, wherein the magnetic field-sensing sensor (31) provides a determination of a force change in the safety belt (1) of a proportional path of the connection element (20) by means of modulation of a field intensity of a magnetic field.

\* \* \* \* \*